US009893854B2

(12) United States Patent
Luo et al.

(10) Patent No.: US 9,893,854 B2
(45) Date of Patent: Feb. 13, 2018

(54) SEQUENCE MAPPING FOR LTE/LTE-A WITH UNLICENSED SPECTRUM

(71) Applicant: QUALCOMM Incorporated, San Diego, CA (US)

(72) Inventors: Tao Luo, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 641 days.

(21) Appl. No.: 14/489,226

(22) Filed: Sep. 17, 2014

(65) Prior Publication Data

US 2015/0085793 A1    Mar. 26, 2015

Related U.S. Application Data

(60) Provisional application No. 61/880,499, filed on Sep. 20, 2013.

(51) Int. Cl.
  *H04L 5/00* (2006.01)
  *H04L 25/02* (2006.01)
  *H04W 16/14* (2009.01)

(52) U.S. Cl.
  CPC ........ *H04L 5/0048* (2013.01); *H04L 25/0224* (2013.01); *H04W 16/14* (2013.01)

(58) Field of Classification Search
  None
  See application file for complete search history.

(56) References Cited

U.S. PATENT DOCUMENTS

| | | | |
|---|---|---|---|
| 2010/0189058 A1* | 7/2010 | Kawamura | H04L 5/0026 370/329 |
| 2013/0195043 A1 | 8/2013 | Chen et al. | |
| 2014/0112303 A1* | 4/2014 | Popovic | H04L 5/0044 370/330 |
| 2015/0016239 A1* | 1/2015 | Yi | H04J 11/003 370/201 |

FOREIGN PATENT DOCUMENTS

| | | |
|---|---|---|
| WO | WO-2007052115 A2 | 5/2007 |
| WO | WO-2013135944 A1 | 9/2013 |

OTHER PUBLICATIONS

International Search Report and Written Opinion—PCT/US2014/056280—ISA/EPO—Dec. 4, 2014.

\* cited by examiner

*Primary Examiner* — Robert M Morlan
(74) *Attorney, Agent, or Firm* — Liem T. Do

(57) ABSTRACT

Sequence mapping for reference signal is disclosed in which the reference signal sequence at the fixed set of resource blocks around a predetermined common frequency is generated to be independent from the system bandwidth. The reference signal sequence may be generated around the predetermined common frequency or may be configured based on a cell identifier. Either such solution provides a system bandwidth independent means for a user equipment (UE) to detect the reference signal sequence for decoding a bandwidth information bearing signal received from the communicating base station.

25 Claims, 11 Drawing Sheets

CRS Sequence Mapping to REs

– 1 –

SEQUENCE MAPPING FOR LTE/LTE-A WITH UNLICENSED SPECTRUM

CROSS-REFERENCE TO RELATED APPLICATIONS

This application claims the benefit of U.S. Provisional Patent Application No. 61/880,499, entitled, "SEQUENCE MAPPING FOR LTE-U", filed on Sep. 20, 2013, which is expressly incorporated by reference herein in its entirety.

BACKGROUND

Field

Aspects of the present disclosure relate generally to wireless communication systems, and more particularly, to sequence mapping of reference signals for long term evolution (LTE)/LTE-Advanced (LTE-A) communication systems with unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes generating, at a base station, a reference signal for a first subframe, wherein the generating includes centering a first reference signal sequence for a fixed set of resource blocks (RBs) around a predetermined common frequency, and wherein the first reference signal sequence for the fixed set of RBs is independent of the system bandwidth, and transmitting, by the base station, the reference signal in the first subframe to a UE.

In an additional aspect of the disclosure, a method of wireless communication includes receiving, at a UE, a reference signal from a base station at a first subframe, detecting, by the UE, a reference signal sequence in a fixed set of RBs around a predetermined common frequency, wherein the reference signal sequence is independent of a system bandwidth, generating, by the UE, a channel estimate based on the reference signal sequence, and decoding, by the UE, a bandwidth information bearing signal received from the base station using the channel estimate.

In an additional aspect of the disclosure, a method of wireless communication includes generating, at a base station, a plurality of first reference signal, wherein each of the plurality of first reference signal includes a reference signal sequence configured as a function of a cell identifier (ID) of the base station, broadcasting, by the base station, a bandwidth information bearing signal at a predetermined periodicity, and transmitting, by the base station, the plurality of first reference signal, wherein in each of the plurality of first reference signal is transmitted sequentially at the predetermined periodicity.

In an additional aspect of the disclosure, a method of wireless communication includes receiving, at a UE, a first reference signal from a base station, detecting, by the UE, a reference signal sequence in the first reference signal, wherein the reference signal sequence is detected based on a cell ID associated with the base station, generating, by the UE, a channel estimate based on the reference signal sequence, and decoding, by the UE, a bandwidth information bearing signal received from the base station using the channel estimate.

In an additional aspect of the disclosure, an apparatus configured for wireless communication includes means for generating, at a base station, a reference signal for a first subframe, wherein the means for generating includes means for centering a first reference signal sequence for a fixed set of resource blocks (RBs) around a predetermined common frequency, and wherein the first reference signal sequence for the fixed set of RBs is independent of the system bandwidth, and means for transmitting, by the base station, the reference signal in the first subframe to a UE.

In an additional aspect of the disclosure, an apparatus configured for wireless communication includes means for receiving, at a UE, a reference signal from a base station at a first subframe, means for detecting, by the UE, a reference signal sequence in a fixed set of RBs around a predetermined common frequency, wherein the reference signal sequence is independent of a system bandwidth, means for generating, by the UE, a channel estimate based on the reference signal sequence, and means for decoding, by the UE, a bandwidth information bearing signal received from the base station using the channel estimate.

In an additional aspect of the disclosure, an apparatus configured for wireless communication includes means for generating, at a base station, a plurality of first reference signal, wherein each of the plurality of first reference signal includes a reference signal sequence configured as a function of a cell identifier (ID) of the base station, means for broadcasting, by the base station, a bandwidth information bearing signal at a predetermined periodicity, and means for transmitting, by the base station, the plurality of first reference signal, wherein in each of the plurality of first reference signal is transmitted sequentially at the predetermined periodicity.

In an additional aspect of the disclosure, an apparatus configured for wireless communication includes means for receiving, at a UE, a first reference signal from a base station, means for detecting, by the UE, a reference signal sequence in the first reference signal, wherein the reference signal sequence is detected based on a cell ID associated with the base station, means for generating, by the UE, a channel estimate based on the reference signal sequence, and means for decoding, by the UE, a bandwidth information bearing signal received from the base station using the channel estimate.

In an additional aspect of the disclosure, a computer program product has a computer-readable medium having program code recorded thereon. This program code includes code to generate, at a base station, a reference signal for a first subframe, wherein the code to generate includes code to center a first reference signal sequence of the reference signal for a fixed set of resource blocks (RBs) around a predetermined common frequency, and wherein the first reference signal sequence for the fixed set of RBs is independent of the system bandwidth, and code to transmit, by the base station, the reference signal in the first subframe to a UE.

In an additional aspect of the disclosure, a computer program product has a computer-readable medium having program code recorded thereon. This program code includes code to receive, at a UE, a reference signal from a base station at a first subframe, code to detect, by the UE, a reference signal sequence in a fixed set of RBs around a predetermined common frequency, wherein the reference signal sequence is independent of a system bandwidth, code to generate, by the UE, a channel estimate based on the reference signal sequence, and code to decode, by the UE, a bandwidth information bearing signal received from the base station using the channel estimate.

In an additional aspect of the disclosure, a computer program product has a computer-readable medium having program code recorded thereon. This program code includes code to generate, at a base station, a plurality of first reference signal, wherein each of the plurality of first reference signal includes a reference signal sequence configured as a function of a cell identifier (ID) of the base station, code to broadcast, by the base station, a bandwidth information bearing signal at a predetermined periodicity, and code to transmit, by the base station, the plurality of first reference signal, wherein in each of the plurality of first reference signal is transmitted sequentially at the predetermined periodicity.

In an additional aspect of the disclosure, a computer program product has a computer-readable medium having program code recorded thereon. This program code includes code to receive, at a UE, a first reference signal from a base station, detecting, by the UE, a reference signal sequence in the first reference signal, wherein the reference signal sequence is detected based on a cell ID associated with the base station, code to generate, by the UE, a channel estimate based on the reference signal sequence, and code to decode, by the UE, a bandwidth information bearing signal received from the base station using the channel estimate.

In an additional aspect of the disclosure, an apparatus includes at least one processor and a memory coupled to the processor. The processor is configured to generate, at a base station, a reference signal for a first subframe, wherein the configuration of the at least one processor to generate includes configuration to center a first reference signal sequence of the reference signal for a fixed set of resource blocks (RBs) around a predetermined common frequency, and wherein the first reference signal sequence for the fixed set of RBs is independent of the system bandwidth, and to transmit, by the base station, the reference signal in the first subframe to a UE.

In an additional aspect of the disclosure, an apparatus includes at least one processor and a memory coupled to the processor. The processor is configured to receive, at a UE, a reference signal from a base station at a first subframe, to detect, by the UE, a reference signal sequence in a fixed set of RBs around a predetermined common frequency, wherein the reference signal sequence is independent of a system bandwidth, to generate, by the UE, a channel estimate based on the reference signal sequence, and to decode, by the UE, a bandwidth information bearing signal received from the base station using the channel estimate.

In an additional aspect of the disclosure, an apparatus includes at least one processor and a memory coupled to the processor. The processor is configured to generate, at a base station, a plurality of first reference signal, wherein each of the plurality of first reference signal includes a reference signal sequence configured as a function of a cell identifier (ID) of the base station, to broadcast, by the base station, a bandwidth information bearing signal at a predetermined periodicity, and to transmit, by the base station, the plurality of first reference signal, wherein in each of the plurality of first reference signal is transmitted sequentially at the predetermined periodicity.

In an additional aspect of the disclosure, an apparatus includes at least one processor and a memory coupled to the processor. The processor is configured to receive, at a UE, a first reference signal from a base station, detecting, by the UE, a reference signal sequence in the first reference signal, wherein the reference signal sequence is detected based on a cell ID associated with the base station, to generate, by the UE, a channel estimate based on the reference signal sequence, and to decode, by the UE, a bandwidth information bearing signal received from the base station using the channel estimate.

DETAILED DESCRIPTION

Figure 1:
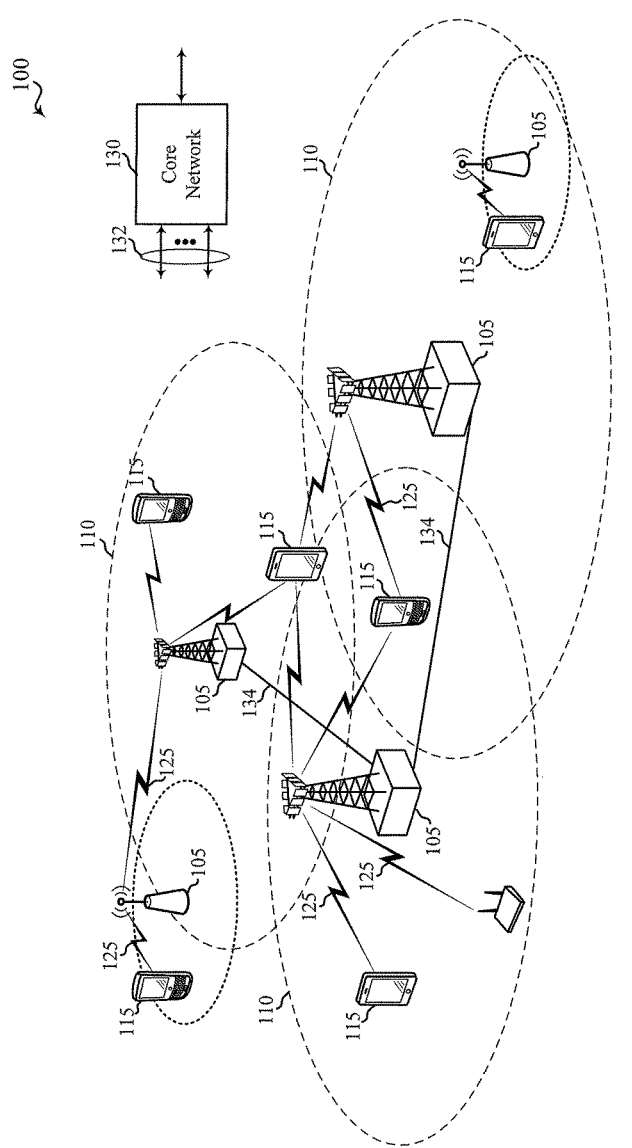
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE/LTE-A in an unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A deployment with unlicensed spectrum (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network on an unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A with and without unlicensed spectrum for a given SP. An LTE/LTE-A network with unlicensed spectrum may provide unicast and/or multicast services according to the needs of the SP. Moreover, LTE/LTE-A network with unlicensed spectrum may operate in a bootstrapped mode in which LTE cells act as anchor and provide relevant cell information (e.g., radio frame timing, common channel configuration, subframe number, system frame number or SFN, etc.). In this mode, there may be close interworking between LTE/LTE-A with and without unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network. In this case, there may be a loose interworking between LTE/LTE-A with and without unlicensed spectrum based on RLC-level aggregation with co-located LTE/LTE-A cells with unlicensed spectrum, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more unlicensed spectrum modes of operation or deployment scenarios. In other embodiments, the system 100 may support wireless communications using an unlicensed spectrum and an access technology different from LTE/LTE-A with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with or without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum, an unlicensed spectrum, or both. Similarly, the uplink transmissions may be made using a licensed spectrum, an unlicensed spectrum, or both.

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A deployment scenarios or modes of operation with unlicensed spectrum in a system such as the system 100, as well as other features and functions related to the operation of LTE/LTE-A with unlicensed spectrum, are provided below with reference to FIGS. 2A-9.

Figure 2A:
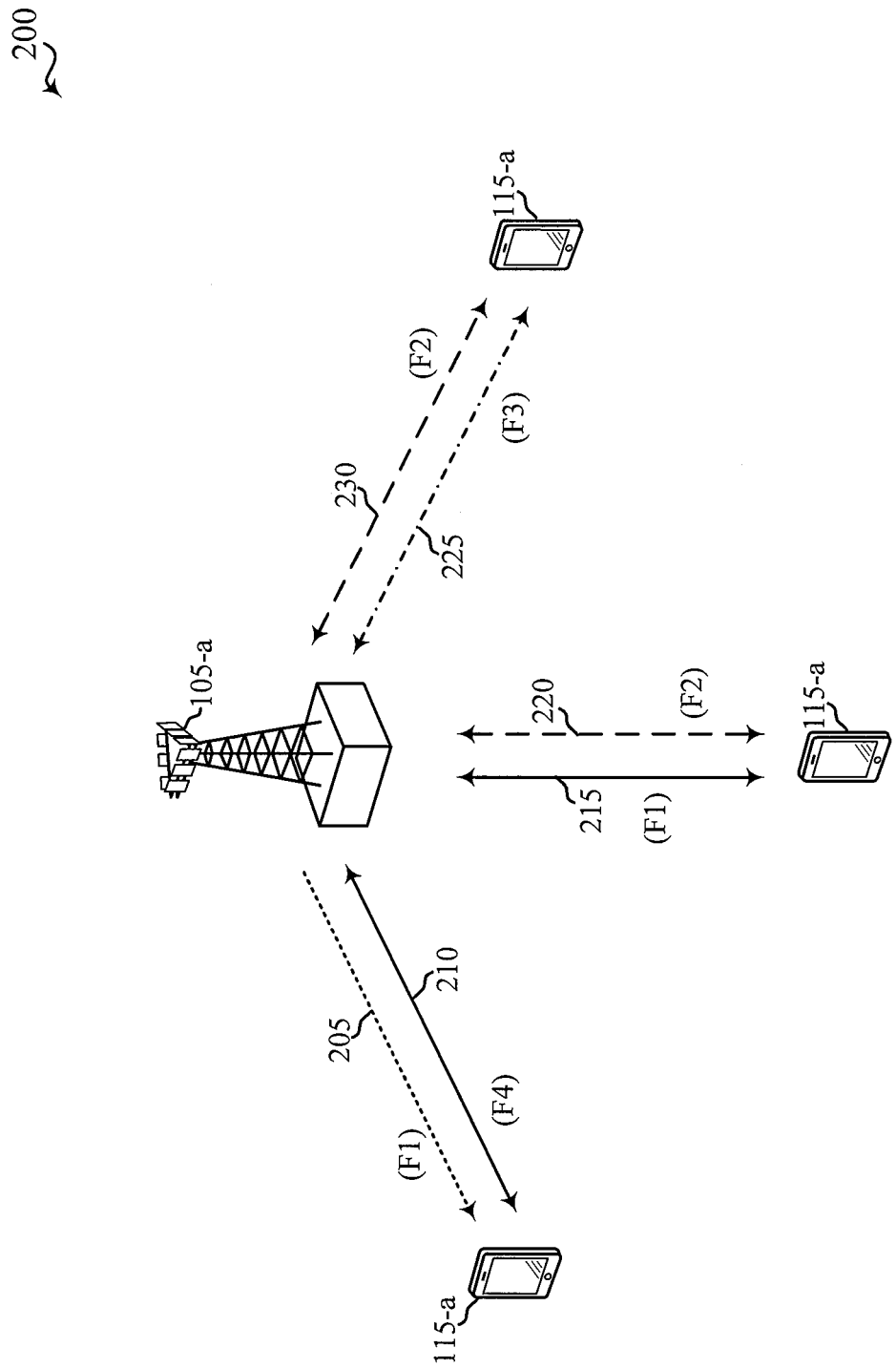
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports communications using unlicensed spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with and without unlicensed spectrum for capacity offload.

As described above, the typical service provider that may benefit from the capacity offload offered by using LTE/LTE-A with unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
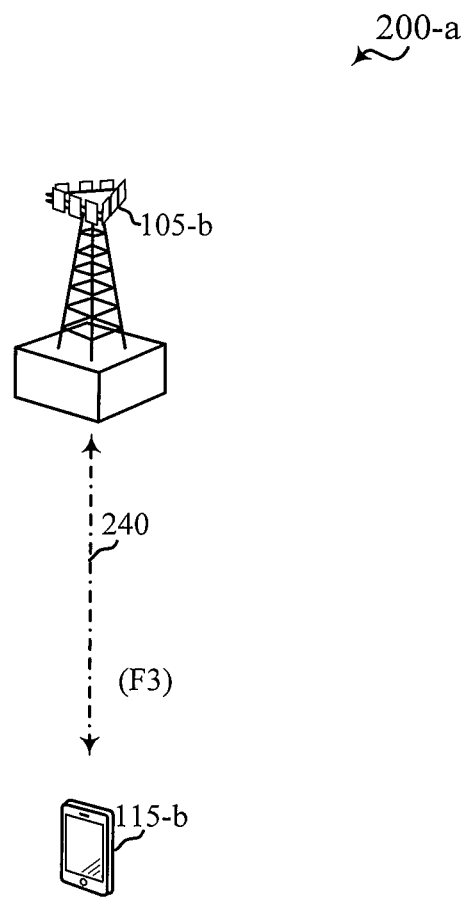
FIG. 2B shows a diagram that illustrates another example of a deployment scenario for using LTE in an unlicensed spectrum according to various embodiments.

FIG. 2B shows a diagram 200-a that illustrates an example of a standalone mode for LTE/LTE-A with unlicensed spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-b using a bidirectional link 240 and may receive SC-FDMA communications signals from the UE 115-b using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the LTE PCC on the unlicensed spectrum. Moreover, LBT may be implemented on both the base station and the UE.

Figure 3:
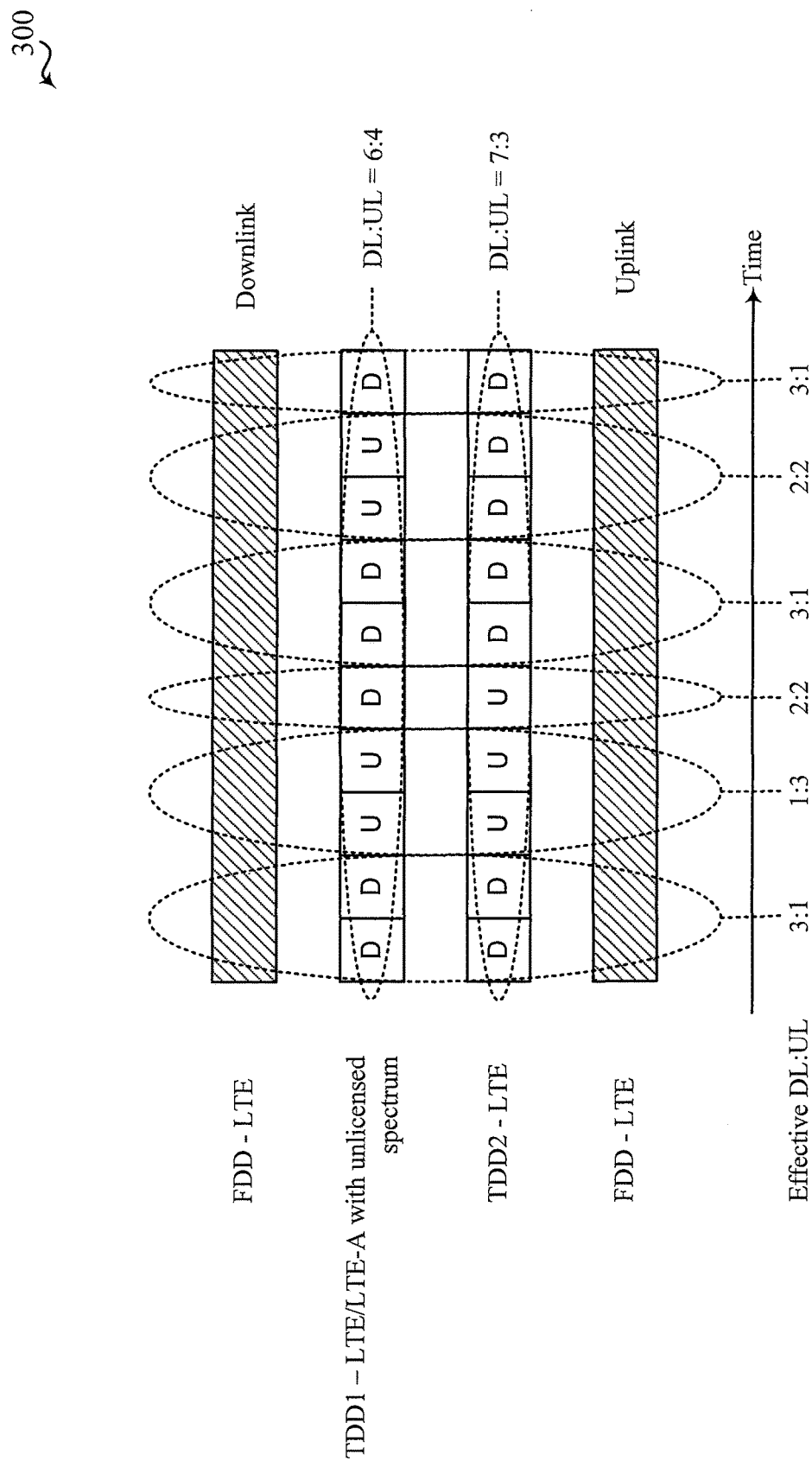
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG.

2A. This type of carrier aggregation may be used in at least portions of the system 100 of FIG. 1. Moreover, this type of carrier aggregation may be used in the base stations 105 and 105-a of FIG. 1 and FIG. 2A, respectively, and/or in the UEs 115 and 115-a of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE, and another FDD (FDD-LTE) may be performed in connection with LTE in the uplink. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with and without unlicensed spectrum.

Figure 4:
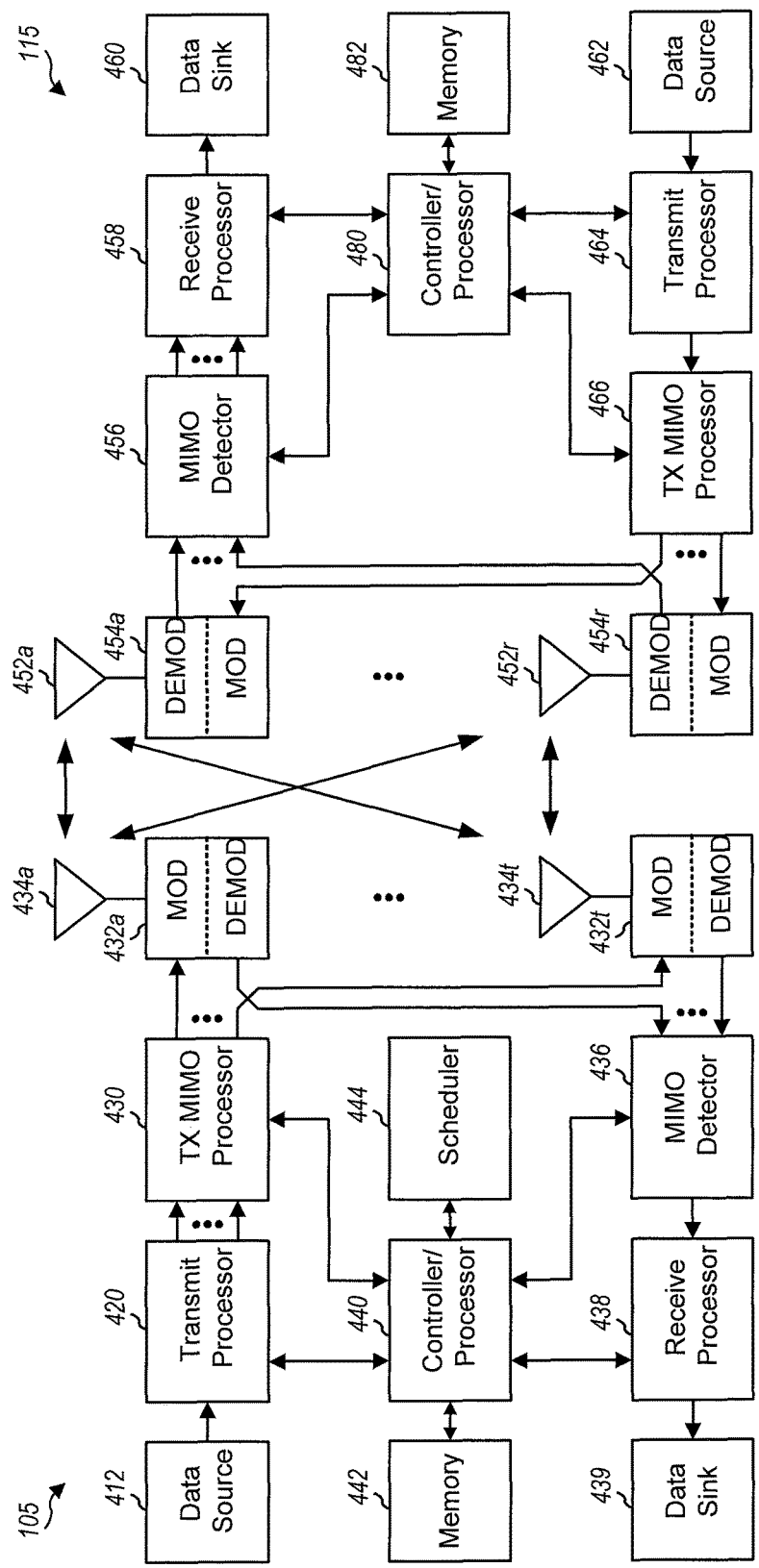
FIG. 4 is a block diagram conceptually illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434a through 434t, and the UE 115 may be equipped with antennas 452a through 452r. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452a through 452r may receive the downlink signals from the eNB 105 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 6A, 6B, 7A, and 7B, and/or other processes for the techniques described herein. The memories 442 and 482 may store data and program codes for the eNB 105 and the UE 115, respectively. A scheduler 444 may schedule UEs for data transmission on the downlink and/or uplink.

LTE wireless communication systems support a flexible system bandwidth for various implementations. LTE systems may be configured for a number of different system bandwidths, such as 1.4, 3, 5, 10, 15, or 20 MHz. In existing LTE systems, the system bandwidth information is typically carried in a system broadcast signal or channel that carries system information, such as the physical broadcast channel (PBCH), enhanced PBCH (ePBCH), or the like. On startup, a UE may not know the bandwidth of the system that it has started up in. The UE, in general, begins by decoding the primary synchronization signal (PSS) and secondary synchronization signal (SSS) to obtain the cell identifier (cell ID). With the cell ID, the UE may then decode the PBCH, which is a bearer band signal, to read the system bandwidth.

Figure 5A:
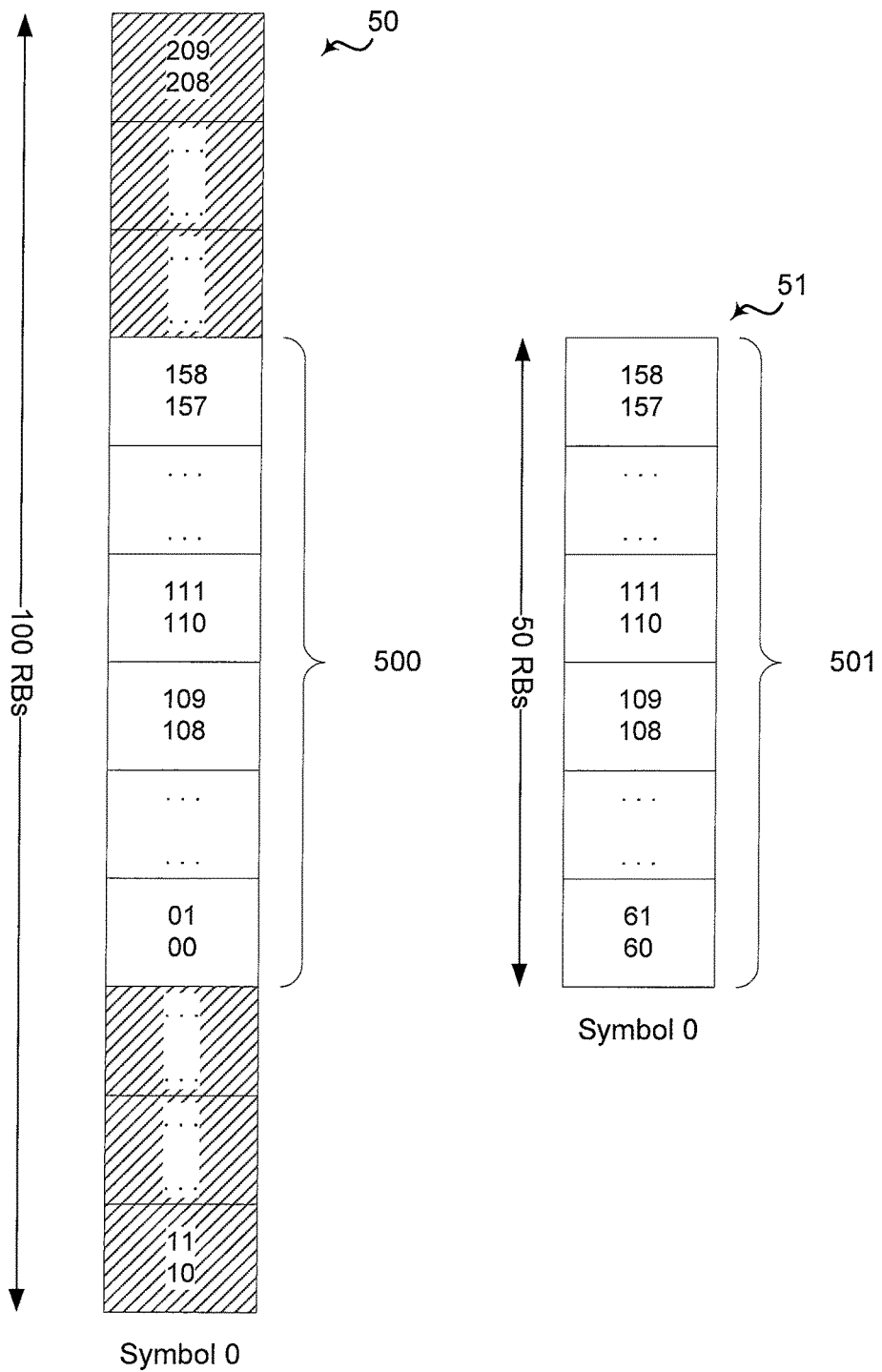
FIG. 5A is a block diagram illustrating transmission blocks including common reference signals for communication systems having different system bandwidths.

Various LTE system attributes may be configured based on or specific to a particular system bandwidth, while other system attributes may be independent of system bandwidth. Sequences for common reference signals (CRSs), for example, are mapped in a way such that the center set of resource blocks (RBs) have the same sequence regardless of system bandwidth. This enables cell search when a UE may not be aware of system bandwidth. FIG. 5A is a block diagram illustrating transmission blocks 50 and 51 for communication systems having different system bandwidths. Transmission block 50 represents a block of 100 RBs transmitted in symbol 0 of a communication system with a 20 MHz system bandwidth. The example numbers identified in the illustrated resource blocks are for demonstration purposes only and conceptually represent the sequence mapping to the resource elements (REs) within each RB. In symbol 0 common reference signals (CRS) are transmitted. The sequence mapping for CRS is determined by the fixed set of RBs 500 centered around a known common frequency. This fixed set of RBs 500 is illustrated, for example, as the center six RBs of transmission block 50. A UE in communication with the base station transmitting the CRS would know the CRS sequence mapping at fixed set of RBs 500. Transmission block 51 represents a block of 50

RBs transmitted in symbol 0 of a communication system with a 10 MHz system bandwidth. CRS transmitted in transmission block 51 has the same sequence mapping in fixed set of RBs 501, as the CRS transmission in transmission block 50. A UE may, therefore, obtain the same sequence mapping for CRS without regard to knowing the system bandwidth by detecting the sequence in the fixed set of RBs 500 or 501.

Figure 5B:
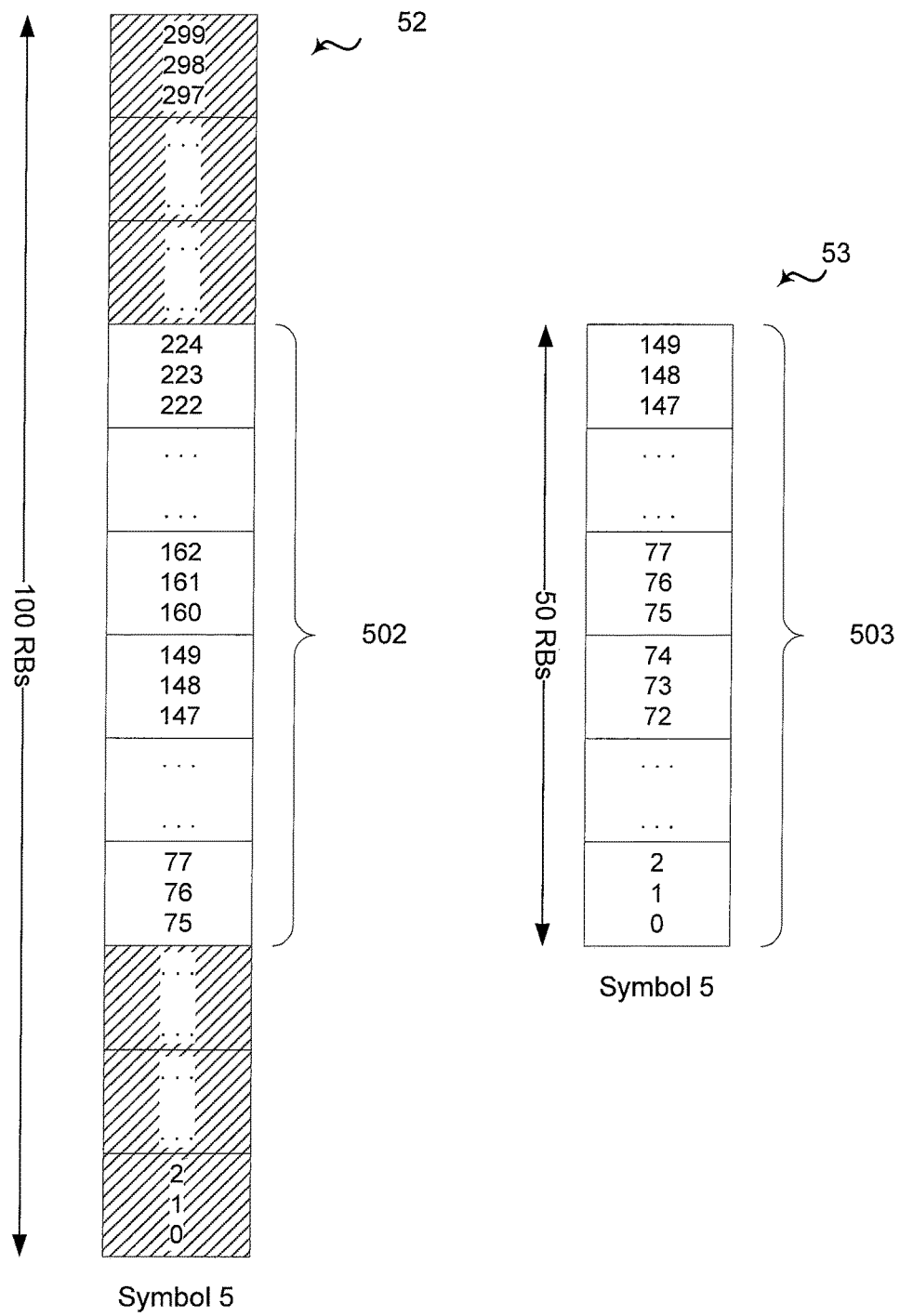
FIG. 5B is a block diagram illustrating transmission blocks including user equipment-specific reference signals for communication systems having different system bandwidths.

In contrast, sequence generation of UE-specific reference signals (UERS) is performed in a way such that the sequence for a smaller bandwidth may be a subset of the sequence for larger bandwidths. Thus, UERS would be aligned from the lowest frequency index. FIG. 5B is a block diagram illustrating transmission blocks 52 and 53 for communication systems having different system bandwidths. Transmission block 50 represents a block of 100 RBs transmitted in symbol 5 of a communication system with a 20 MHz system bandwidth. UERS is transmitted in symbol 5. The fixed set of RBs 502 include the sequence for the UERS in the 20 MHz system. Transmission block 53 represents a block of 50 RBs transmitted in symbol 5 of a communication system with a 10 MHz system bandwidth. The UERS transmitted in symbol 5 of transmission block 53 include a sequence mapping in fixed set of RBs 503. However, because the sequence mapping for UERS are bandwidth dependent, the sequence mapping for the 20 MHz system bandwidth system of transmission block 52 in fixed set of RBs 502 does not match the sequence mapping for the UERS transmitted in transmission block 53 of the 10 MHz system bandwidth system. This frequency-dependent alignment may, thus, create a different UERS sequence for the center set of RBs depending on the particular system bandwidth.

In modern LTE systems and LTE/LTE-A system deployments with unlicensed spectrum, a reference signal sequence (e.g., UERS, CRS, eCRS, etc.) may be used for demodulating/decoding various common channels, such as PBCH, evolved PBCH (ePBCH), and the like. Because the underlying systems support flexible system bandwidths, a UE may not know the system bandwidth on startup. Thus, without knowing the system bandwidth, the UE may not be able to determine the particular sequence of reference signal, which would be used to generate the proper channel estimate for demodulation/decoding the PBCH/ePBCH.

Various aspects of the present disclosure provide solutions for ensuring that a UE is able to determine the sequence mapping for a reference signal (e.g., UERS, CRS, etc.) regardless of the system bandwidth configuration. In supplemental downlink (SDL) or carrier aggregation (CA) modes of LTE/LTE-A with unlicensed spectrum, by leveraging the guaranteed transmissions of the licensed spectrum carriers, a primary component carrier (PCC) may be used to carry system bandwidth information for a non-guaranteed, unlicensed band secondary component carrier (SCC). However, this option would not be available in standalone (SA) mode LTE/LTE-A deployments with unlicensed spectrum. Thus, in order to be compatible for advanced LTE systems and any mode of communication over unlicensed spectrum, various aspects of the present disclosure provide for solutions that change the sequence mapping in order to ensure that a UE will know the reference signal sequence in order to demodulate/decode the bandwidth information bearing signals, such as PBCH, ePBCH, and the like, from the network.

In a first example aspect of the present disclosure, various implementations provide for UERS sequences to be generated in the same manner as CRS is generated in current LTE systems. In such aspects, the center N RBs will have the same UERS sequence regardless of system bandwidth. Depending on the deployment or system, N may be 4, 6, 8, or any other applicable number of RBs. In additional aspects of the present disclosure other types of reference signals may be generated in a similar manner.

Figures 6A, 6B:
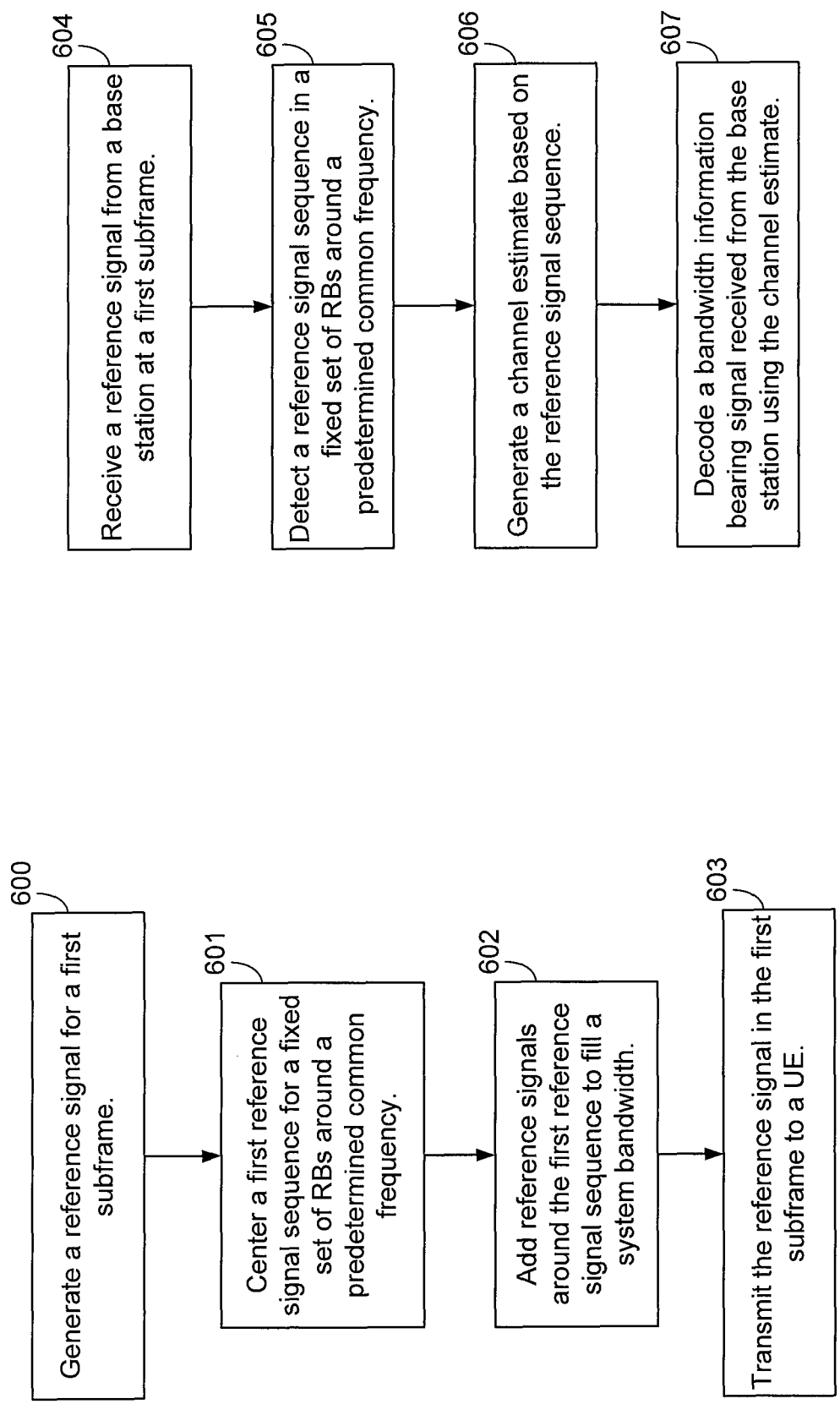
FIGS. 6A and 6B are functional block diagrams illustrating example blocks executed to implement one aspect of the present disclosure.

FIGS. 6A and 6B are functional block diagrams illustrating example blocks executed to implement one aspect of the present disclosure. At block 600, a base station generates a reference signal (UERS, CRS, eCRS, etc.) for a first subframe to transmit to a particular UE. The generation process includes blocks 601 and 602. At block 601 of the generation process, a first reference signal sequence is centered for a fixed set of RBs around a predetermined common frequency. The fixed set of RBs may, as noted above, be various numbers of center RBs, such as 4, 6, 8, or the like. The predetermined common frequency may also typically be the center frequency of the transmission or the common search bandwidth that is known to devices in the system. Thus, the reference signal is generated by centering the first reference signal sequence for this set of center RBs around the predetermined center frequency.

At block 602, additional references signals are then added around the first reference signal sequence in order to fill the system bandwidth. In some aspects, the first reference signal sequence in the fixed set of RBs may be repeated on either side in order to fill the system bandwidth, while in other aspects, additional reference signal extensions may be added to the first reference signal sequence. Thus, in generating the reference signal, the first reference signal sequence will be independent from the system bandwidth. At block 603, after generation of the reference signal for the first subframe is complete, the base station transmits the reference signal in the first subframe to the UE.

On the UE end, at block 604, the UE receives the reference signal from the base station at the first subframe. The UE detects, at block 605, the reference signal sequence in the fixed set of RBs around the predetermined common frequency. In the illustrated aspects of the present disclosure, the UE know to detect the proper reference signal sequence at the center RBs around the center.

Using the sequence mapping from the reference signal sequence, the UE generates, at block 606, a channel estimate based on the reference signal sequence. Thus, without necessity of knowledge of the system bandwidth, the UE is able to detect the proper reference signal sequence in the reference signal from the base station and utilize that sequence to generate the channel estimate. At block 607, the UE may then decode a bandwidth information bearing signal received from the base station using the channel estimate.

The reference signal sequence may also be linked to the subframe number or system frame number (SFN). A UE may obtain the SFN through blind decoding or from the management information block (MIB) transmissions from a base station. Thus, by knowing the SFN and knowing the manner in which the sequence is based on the SFN, a UE would be able to determine the sequence mapping by obtaining the SFN. For example, it may be beneficial to have a different reference signal sequence in subsequent subframes. In current systems, the CRS is transmitted every 10 ms, while the PBCH can be transmitted every 20, 40, or 80 ms. In order to decode the PBCH in subsequent transmissions, it may be useful to have a different reference signal sequence. As such, in subframe 0, which corresponds to a first SFN, the reference signal includes a first reference signal sequence. In subframe 20, which corresponds to a different specific SFN, the reference signal is generated using a different sequence mapping that may be used to decode the PBCH transmitted at a 20 ms predetermined periodicity. According to various alternative aspects of the present disclosure, the UE may obtain the SFN from the network. If the obtained SFN is the first SFN, then the UE knows to detect the first reference signal sequence. However, if the obtained SFN is the different specific SFN for subframe 20, then the UE knows to detect the different sequence mapping associated with the reference signal transmitted in subframe 20. Alternatively, the two different reference signals may be transmitted in the same SFN, but in different subframes. Thus, the UE may be able to determine both sequence mappings through the SFN.

In another aspect of the present disclosure, different types of reference signal sequences may be included. For example, a specific reference signal sequence for purposes of decoding bandwidth information bearing signals may be provided, where the specific reference signal sequence is configured as a function of the cell ID and, thus, independent of system bandwidth used. The additional types of reference signal and reference signal sequences may include existing reference signal sequences that are dependent on the system bandwidth. Thus, in the additional aspects, at least two types of reference signal sequences may be generated. A first type that is independent of bandwidth, which may be used by the UE to decode/demodulate system bandwidth information bearing signals, and a second type that may be used for all other RBs of any other particular transmission, which may have a sequence based on existing sequence generation techniques.

Figures 7A, 7B:
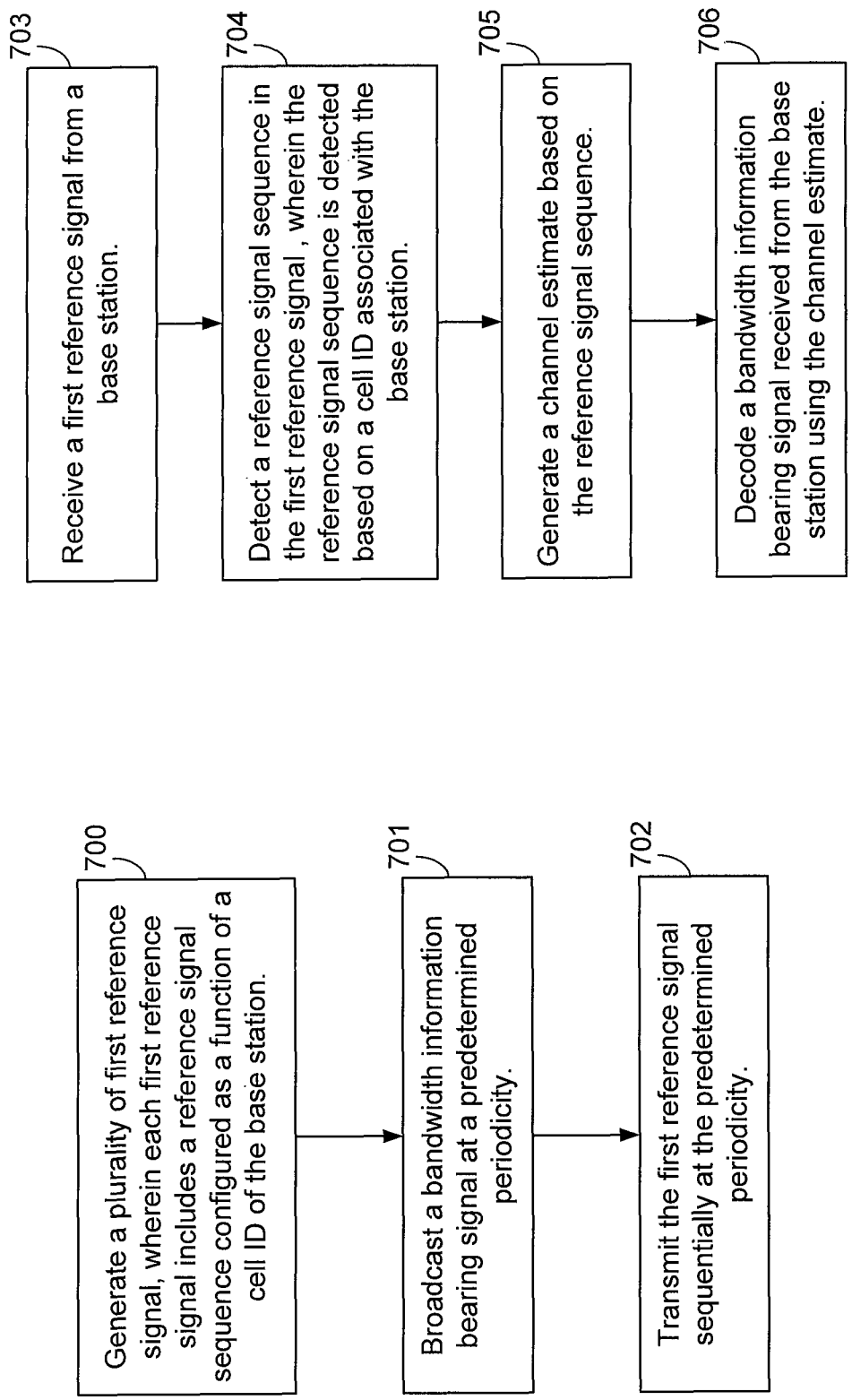
FIGS. 7A and 7B are functional block diagrams illustrating example blocks executed to implement one aspect of the present disclosure.

FIGS. 7A and 7B are functional block diagrams illustrating example blocks executed to implement one aspect of the present disclosure. At block 700, a base station generates a plurality of first reference signal, wherein each of such first reference signal includes a reference signal sequence configured as a function of the base station cell ID. As the reference signal sequence is configured based on the cell ID, it is independent from the system bandwidth.

At block 701, the base station, generates and broadcasts a bandwidth information bearing signal at a predetermined periodicity. The base station will broadcast various signals that include system information, such as the base station's cell ID, any semi-static resource allocation information, and, as noted, system bandwidth information, among other such system information. The base station will periodically broadcast this system information, such as the bandwidth information bearing signal, at various predetermined periodicities. As noted above, an example of one such common bandwidth information bearing signal is the PBCH and ePBCH. Such broadcast channels may be transmitted at 20, 40, and 80 ms intervals or periods. At block 702, the base station transmits the plurality of first reference signal sequentially at the same predetermined periodicity as the broadcast bandwidth information bearing signals. For example, a first of the plurality of first reference signal may be transmitted with the first transmission of the bandwidth information bearing signal and then the second of the plurality of first reference signal may be transmitted after 40 ms, where 40 ms is the predetermined periodicity of the bandwidth information bearing signals. With each successive period, the base station broadcasts the bandwidth information bearing signal and one of the plurality of first reference signal which include the reference signal sequence.

At the UE side, at block 703, the UE receives a first reference signal from the base station. The UE, while it may not yet know the system bandwidth, knows the cell ID of the base station. At block 704, the UE detects the reference signal sequence in the first reference signal, wherein the reference signal sequence is detected based on the cell ID. Using the detected reference signal sequence, the UE generates a channel estimate, at block 705, and decodes the bandwidth information bearing signal received from the base station, at block 706, using the channel estimate. Thus, the UE is able to detect the reference signal sequence without knowing the system bandwidth, which allows the UE to properly generate a channel estimate and decode the bandwidth information bearing signals.

It should be noted that aspects of the present disclosure that provide for such cell ID-based sequences may still be linked to an RB index. However, RB index is independent of system bandwidth.

When bandwidth information bearing signals are transmitted together with other channels through frequency division multiplexing (FDM) within the same subframe, a subset of a subframe or frame, a different sequence may be used for decoding different channels. For example, PBCH and ePBCH may use the center six RBs for the bandwidth independent sequence mapping, while the remaining RBs within the system bandwidth are used for other channels. Reference signal sequence generation for those other channels may be independent of the reference signal sequence generation for the bandwidth information bearing signals. For such other transmission frames, existing LTE reference signal sequence generating techniques may be used.

Figure 8:
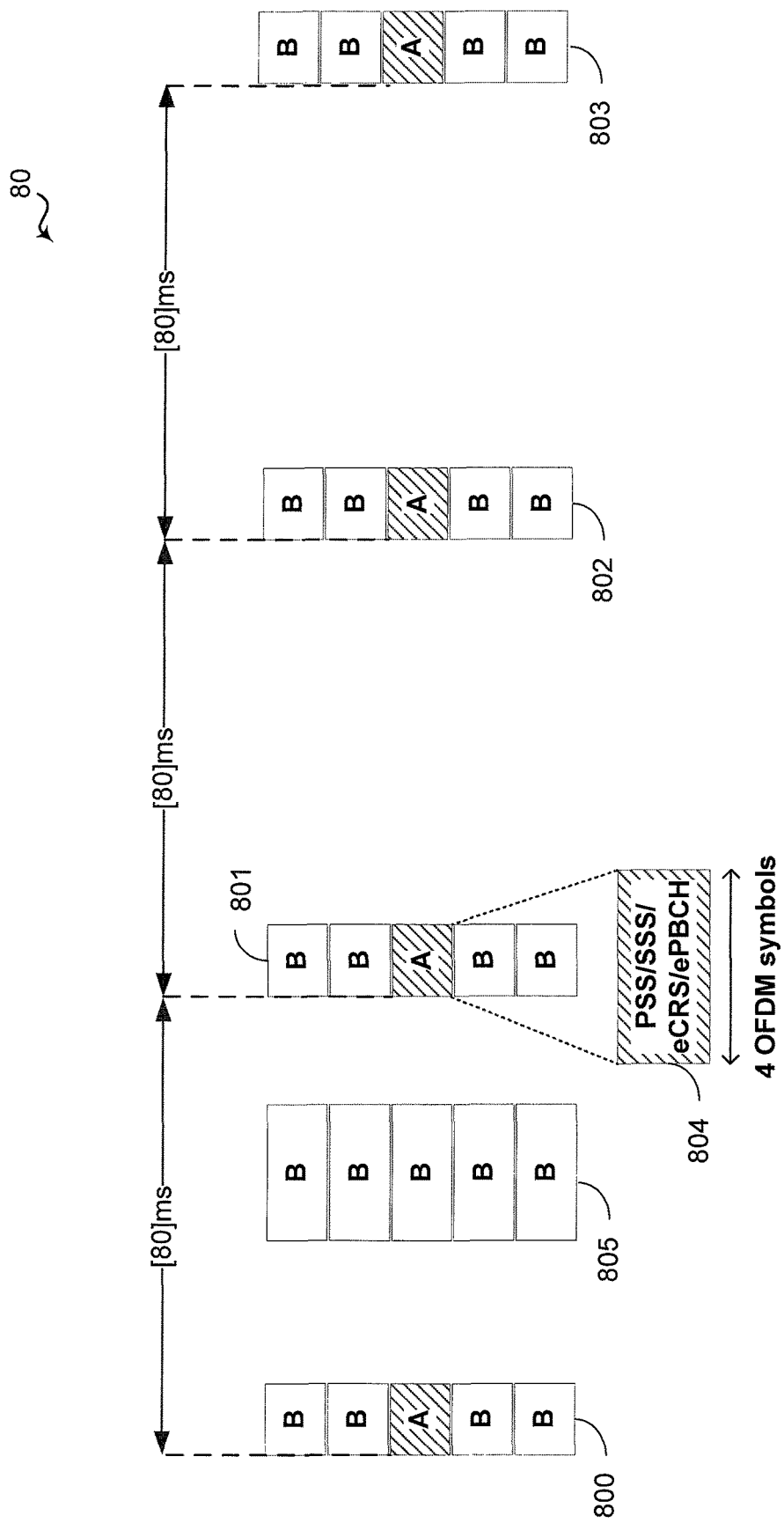
FIG. 8 is a block diagram illustrating transmission stream in a wireless communication system having base stations and UEs configured according to one aspect of the present disclosure.
Figure 9:
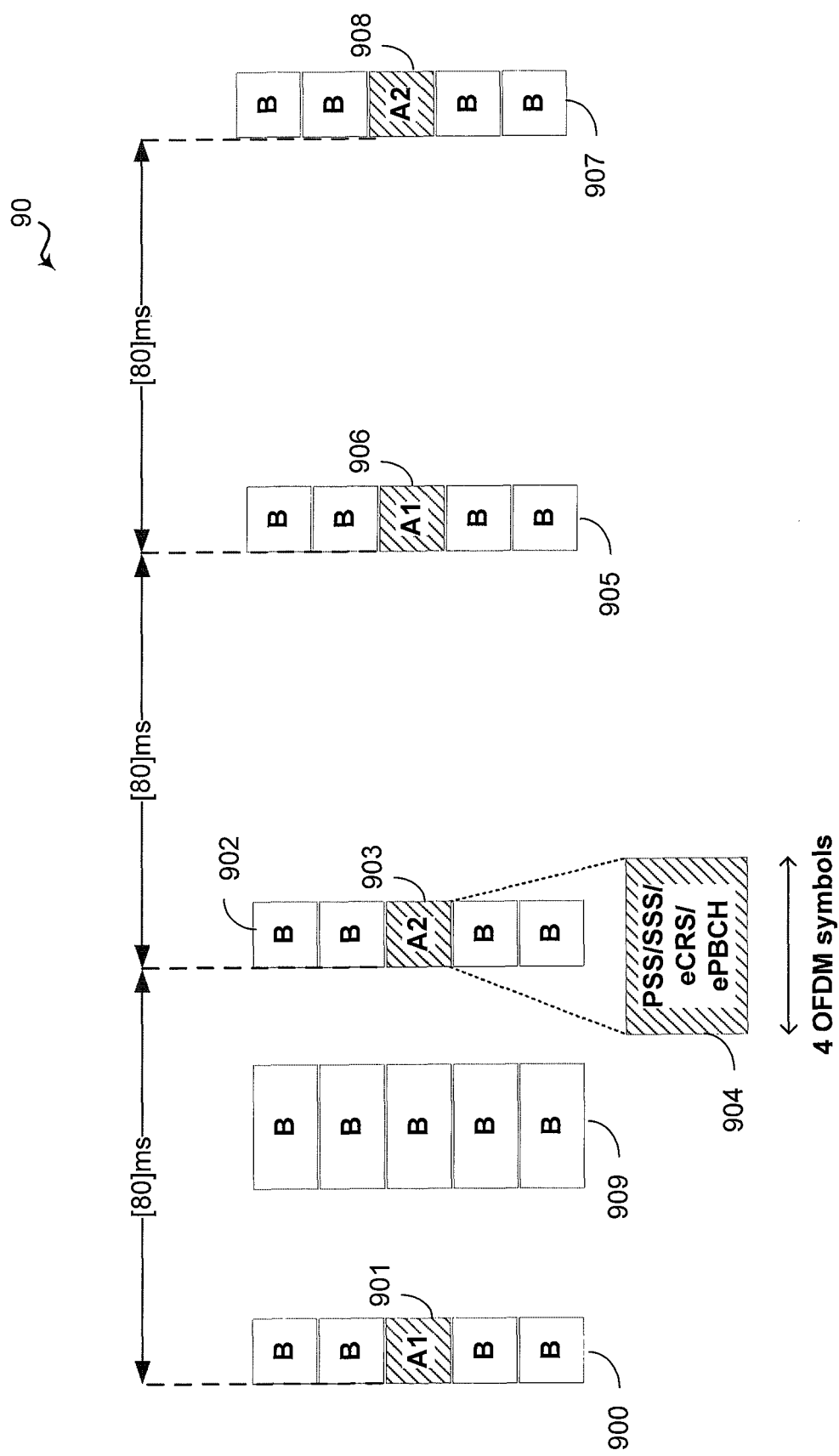
FIG. 9 is a block diagram illustrating transmission stream in a wireless communication system having base stations and UEs configured according to one aspect of the present disclosure.

Reference signal sequence generation for RBs used for various types of bandwidth information bearing signals may be different from other RBs in a same or different transmission occasion. FIG. 8 is a block diagram illustrating transmission stream 80 in a wireless communication system having base stations and UEs configured according to one aspect of the present disclosure. For example, transmission stream 80 may be communicated between eNB 105 and UE 115, which may both be configured according to the various aspects of the present disclosure to perform the functionalities illustrated and described with respect to FIGS. 6A, 6B, 7A, and 7B. Transmission stream 80 includes transmission blocks 800-803 include regular transmission RBs labeled 'B', and, at the fixed set of RBs around the common frequency, bandwidth independent reference signal sequence labeled 'A'. Transmission blocks 800-803 are transmitted at an interval of 80 ms. Also, within the fixed set of RBs, the OFDM symbols 804 include PSS, SSS, eCRS, and ePBCH. Regular transmission RBs in transmission block 805 also include a reference signal sequence at same frequency as the bandwidth independent reference signal sequence 'A'. The regular, bandwidth dependent reference signal sequence 'B' of transmission block 805, may be used in decoding the regular transmission RBs of transmission block 805, while the bandwidth independent reference signal sequence 'A' may be used to decode ePBCH of OFDM symbols 804, transmitted in each of transmission blocks 800-803 at the fixed set of RBs. A UE receiving communications from a base station generating transmission blocks 800-803 and transmission block 805 will be configured to decode the ePBCH of OFDM symbols 804 by detecting the bandwidth independent reference signal sequence at 'A' and decode the regular transmission RBs 'B' using the bandwidth dependent reference signal at the fixed set of RBs 'B' in transmission block 805.

It should be noted that, as illustrated in FIG. 8, the bandwidth independent reference signal sequence may be generated and detected according to either of the aspects illustrated and described with respect to FIGS. 6A, 6B, 7A, and 7B.

Reference signal sequence generation for RBs used for ePBCH may also vary over time with some periodicity. FIG.

9 is a block diagram illustrating transmission stream 90 in a wireless communication system having base stations and UEs configured according to one aspect of the present disclosure. Transmission stream 90 includes periodic transmission blocks 900, 902, 905, and 907 in addition to regular RB transmission block 909 having a bandwidth dependent reference signal sequence for decoding regular transmission RBs. Periodic transmission blocks 900 and 905 each include a first type of reference signal sequence 901 and 908 labeled 'A1'. Periodic transmission blocks 902 and 907 each include a second type of reference signal sequence 903 and 903 labeled 'A2'. The second type of reference signal sequence 'A2' is a different sequence mapping than the first type of reference signal sequence 'A1'. While each of periodic transmission blocks 900, 902, 905, and 907 are transmitted at a predetermined periodicity of 80 ms, the first type of reference signal sequences 901 and 906, and the second type of reference signal sequences 903 and 908 are transmitted at periodicity of 160 ms. Thus, a different common signal may be decoded at alternating intervals of OFDM symbols 904, transmitted in each of periodic transmission blocks 900, 902, 905, and 907.

For each of the bandwidth information bearing signals that carries system information, including bandwidth information, within the center frequency RBs or the common frequency, the base station may encode the transmissions using bundled physical RBs (PRBs). When bundling PRBs, the base station may either precode each of the center frequency RBs using the same precoding parameters or they may precode each of the center frequency RBs using a related set of precoding parameters. On the UE side, the UE will either know to assume that the same precoding is used for all of the center frequency RBs, in which case a single channel estimate may be generated and used for decoding, or will know the set of precoding parameters that are used along with the progression relationship between the RB and precoding parameter. In the aspect where the center frequency RBs are bundled using a fixed set of precoding parameters, the UE would first align the phase of the first RBs using the known precoding. Then, for each successive RB, the UE would rotate the phase of the channel estimate by the known progression in order to decode the next RB of the center frequency RBs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6A, 6B, 7A, and 7B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
generating, at a base station, a reference signal for a first subframe, wherein the generating include centering a first sequence of the reference signal for a fixed set of resource blocks (RBs) around a predetermined common frequency independent of a system bandwidth;
transmitting, by the base station, the reference signal in the first subframe;
precoding, at the base station, at least one of:
each RB of a set of RBs for a bandwidth information bearing signal using a same precoding, or
a set of RBs for a bandwidth information bearing signal using a fixed set precoding parameters known to the UE; and
transmitting the bandwidth information bearing signal using the precoded set of RBs.

2. The method of claim 1, wherein the predetermined common frequency includes a common cell search bandwidth of a communication system in which the base station resides.

3. The method of claim 1, further including:
generating, at the base station, a second reference signal for another subframe, wherein a second sequence of the second reference signal is different than the first sequence, and wherein the first sequence is associated with a first system frame number or a first subframe number and the second sequence is associated with a second system frame number or a second subframe number; and
transmitting, by the base station, the second reference signal in the another subframe.

4. The method of claim 3, wherein the second sequence for the fixed set of RBs is independent of the system bandwidth.

5. The method of claim 1, further including:
precoding, at the base station, each RB of a set of RBs for a bandwidth information bearing signal using a same precoding; and
transmitting the bandwidth information bearing signal using the precoded set of RBs.

6. The method of claim 1, further including:
precoding, at the base station, a set of RBs for a bandwidth information bearing signal using a fixed set precoding parameters known to the UE; and
transmitting the bandwidth information bearing signal using the precoded set of RBs.

7. A method of wireless communication, comprising:
receiving, at a user equipment (UE), a reference signal from a base station at a first subframe;
detecting, by the UE, a reference signal sequence in a fixed set of resource blocks (RBs) around a predetermined common frequency, wherein the reference signal sequence is independent of a system bandwidth;
generating, by the UE, a channel estimate based on the reference signal sequence; and
decoding, by the UE, a bandwidth information bearing signal received from the base station using the channel estimate,
wherein the decoding the bandwidth information bearing signal includes at least one of:
decoding the bandwidth information bearing signal using a same precoding for each RB in a set of RBs carrying the bandwidth information bearing signal from the base station, or
decoding the bandwidth information bearing signal using a predetermined set of precoding parameters for the fixed set of RBs around the predetermined common frequency for the bandwidth information bearing signal, wherein the UE selects the precoding parameter from the predetermined set of precoding parameters for decoding an associated RB of the fixed set of RBs using a known recoding sequence.

8. The method of claim 7, wherein the predetermined common frequency includes a common cell search bandwidth of a communication system in which the UE resides.

9. The method of claim 7, further including:
obtaining a current system frame number (SFN) or a current subframe number from the base station, wherein the detecting the reference signal sequence is based on the current SFN or current subframe number.

10. The method of claim 9, further including:
receiving, at the UE, a second reference signal from the base station at another subframe;
obtaining another SFN or another subframe number from the base station associated with the another subframe;
detecting a second reference signal sequence in the fixed set of RBs around the predetermined common frequency, wherein the detecting is based on the another SFN;
generating a second channel estimate based on the second reference signal sequence; and
decoding a second bandwidth information bearing signal from the base station using the channel estimate.

11. The method of claim 10, wherein the second reference signal sequence is independent of the system bandwidth.

12. The method of claim 7, wherein the decoding the bandwidth information bearing signal includes:
decoding the bandwidth information bearing signal using a same precoding for each RB in a set of RBs carrying the bandwidth information bearing signal from the base station.

13. The method of claim 7, wherein the decoding the bandwidth information bearing signal includes:
decoding the bandwidth information bearing signal using a predetermined set of precoding parameters for the fixed set of RBs around the predetermined common frequency for the bandwidth information bearing signal, wherein the UE selects the precoding parameter from the predetermined set of precoding parameters for decoding an associated RB of the fixed set of RBs using a known precoding sequence.

14. A non-transitory computer-readable medium having program code recorded thereon, the program code comprising:
   program code for causing a computer to generate, at a base station, a reference signal for a first subframe, wherein the program code to generate includes program code to center a first reference signal sequence for a fixed set of resource blocks (RBs) around a predetermined common frequency;
   program code to transmit, by the base station, the reference signal in the first subframe to a user equipment (UE);
   program code to precode, at the base station, at least one of:
      each RB of a set of RBs for a bandwidth information bearing signal using a same precoding, or
      a set of RBs for a bandwidth information bearing signal using a fixed set precoding parameters known to the UE; and
   program code to transmit the bandwidth information bearing signal using the precoded set of RBs.

15. The non-transitory computer-readable medium of claim 14, wherein the predetermined common frequency includes a common cell search bandwidth of a communication system in which the base station resides.

16. The non-transitory computer-readable medium of claim 14, further including:
   program code to generate, at the base station, a second reference signal for another subframe, wherein a second reference signal sequence of the second reference signal is different than the first reference signal sequence, and wherein the first reference signal sequence is associated with a first system frame number or a first subframe number and the second reference signal sequence is associated with a second system frame number or a second subframe number; and
   program code to transmit, by the base station, the second reference signal in the another subframe to the UE.

17. The non-transitory computer-readable medium of claim 16, wherein the second reference signal sequence for the fixed set of RBs is independent of the system bandwidth.

18. The non-transitory computer-readable medium of claim 14, further including:
   program code to precode, at the base station, each RB of a set of RBs for a bandwidth information bearing signal using a same precoding; and
   program code to transmit the bandwidth information bearing signal using the precoded set of RBs.

19. The non-transitory computer-readable medium of claim 14, further including:
   program code to precode, at the base station, a set of RBs for a bandwidth information bearing signal using a fixed set precoding parameters known to the UE; and
   program code to transmit the bandwidth information bearing signal using the precoded set of RBs.

20. An apparatus configured for wireless communication, the apparatus comprising:
   at least one processor; and
   a memory coupled to the at least one processor,
   wherein the at least one processor is configured:
      to generate, at a base station, a reference signal for a first subframe, wherein the configuration of the at least one processor to generate includes configuration to center a first reference signal sequence for a fixed set of resource blocks (RBs) around a predetermined common frequency;
      to transmit, by the base station, the reference signal in the first subframe to a user equipment (UE);
      to precode, at the base station, at least one of:
         each RB of a set of RBs for a bandwidth information bearing signal using a same precoding, or
         a set of RBs for a bandwidth information bearing signal using a fixed set precoding parameters known to the UE; and
      to transmit the bandwidth information bearing signal using the precoded set of RBs.

21. The apparatus of claim 20, wherein the predetermined common frequency includes a common cell search bandwidth of a communication system in which the base station resides.

22. The apparatus of claim 20, wherein the at least one processor is further configured to generate, at the base station, a second reference signal for another subframe, wherein a second reference signal sequence of the second reference signal is different than the first reference signal sequence, and wherein the first reference signal sequence is associated with a first system frame number or a first subframe number and the second reference signal sequence is associated with a second system frame number or a second subframe number; and
   to transmit, by the base station, the second reference signal in the another subframe to the UE.

23. The apparatus of claim 22, wherein the second reference signal sequence for the fixed set of RBs is independent of the system bandwidth.

24. The apparatus of claim 20, wherein the at least one processor is further configured:
   to precode, at the base station, each RB of a set of RBs for a bandwidth information bearing signal using a same precoding; and
   to transmit the bandwidth information bearing signal using the precoded set of RBs.

25. The apparatus of claim 20, wherein the at least one processor is further configured:
   to precode, at the base station, a set of RBs for a bandwidth information bearing signal using a fixed set precoding parameters known to the UE; and
   to transmit the bandwidth information bearing signal using the precoded set of RBs.

* * * * *

UNITED STATES PATENT AND TRADEMARK OFFICE
CERTIFICATE OF CORRECTION

PATENT NO. : 9,893,854 B2
APPLICATION NO. : 14/489226
DATED : February 13, 2018
INVENTOR(S) : Tao Luo et al.

Page 1 of 1

It is certified that error appears in the above-identified patent and that said Letters Patent is hereby corrected as shown below:

In the Claims

At Column 20, Claim number 7, Line number 34, delete "a known recoding sequence" and replace with --a known precoding sequence--.

Signed and Sealed this
Third Day of September, 2019

Andrei Iancu
*Director of the United States Patent and Trademark Office*